US011095180B2

(12) United States Patent
Ogawa et al.

(10) Patent No.: US 11,095,180 B2
(45) Date of Patent: Aug. 17, 2021

(54) MOTOR INCLUDING A HOLDING MEMBER SUPPORT PORTION WHICH SUPPORTS PORTIONS OF A BUS BAR

(71) Applicant: Nidec Corporation, Kyoto (JP)

(72) Inventors: Kosuke Ogawa, Kyoto (JP); Tatsuya Onishi, Kyoto (JP); Takashi Seguchi, Kyoto (JP); Yasuhiko Iwano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 66 days.

(21) Appl. No.: 16/487,220

(22) PCT Filed: Mar. 16, 2018

(86) PCT No.: PCT/JP2018/010601
§ 371 (c)(1),
(2) Date: Aug. 20, 2019

(87) PCT Pub. No.: WO2018/180640
PCT Pub. Date: Oct. 4, 2018

(65) Prior Publication Data
US 2020/0014271 A1   Jan. 9, 2020

Related U.S. Application Data

(60) Provisional application No. 62/479,488, filed on Mar. 31, 2017.

(30) Foreign Application Priority Data

Sep. 29, 2017   (JP) .............................. JP2017-191095

(51) Int. Cl.
*H02K 3/52*   (2006.01)
*H02K 1/14*   (2006.01)
(Continued)

(52) U.S. Cl.
CPC ................. *H02K 3/52* (2013.01); *H02K 1/14* (2013.01); *H02K 3/30* (2013.01); *H02K 3/34* (2013.01);
(Continued)

(58) Field of Classification Search
CPC .. H02K 1/14; H02K 3/30; H02K 3/34; H02K 3/345; H02K 3/52; H02K 2203/09
(Continued)

(56) References Cited

U.S. PATENT DOCUMENTS 8,193,677 B2   6/2012   Murakami et al.
8,729,755 B2 *   5/2014   Nakagawa ............. H02K 5/225
310/71
(Continued)

FOREIGN PATENT DOCUMENTS

EP   1 492 213 A1   12/2004
JP   64-77450 A   3/1989
(Continued)

OTHER PUBLICATIONS

Official Communication issued in International Patent Application No. PCT/JP2018/010601, dated Jun. 12, 2018.
(Continued)

*Primary Examiner* — Tulsidas C Patel
*Assistant Examiner* — Rashad H Johnson
(74) *Attorney, Agent, or Firm* — Keating & Bennett

(57) ABSTRACT

A motor includes a first bus bar including a first extension, a second extension, and a first bus bar body including a first corner to which the first extension and the second extension are connected. A holder includes a support to support the first bus bar body, a pair of first walls, and a pair of second walls. The pair of first walls include wall surfaces that face each other in the first perpendicular direction and are spaced by a gap from each other, and extend in the first direction.
(Continued)

The pair of second walls include wall surfaces that face each other in the second perpendicular direction and are spaced by a gap from each other, and extend in the second direction. A first space is provided between the pair of first walls and the pair of second walls. The first corner is provided in the first space.

6 Claims, 10 Drawing Sheets

(51) Int. Cl.
  *H02K 3/30* (2006.01)
  *H02K 3/34* (2006.01)
(52) U.S. Cl.
  CPC ......... *H02K 3/345* (2013.01); *H02K 2203/09* (2013.01)
(58) Field of Classification Search
  USPC ............... 310/49.13, 71, 179, 215, 216.001, 310/216.105, 216.115
  See application file for complete search history.

(56) References Cited

U.S. PATENT DOCUMENTS 9,190,878 B2  11/2015  Kottmyer et al.
2009/0058215 A1*  3/2009  Murakami ............. H02K 3/522
                                             310/208
2009/0102312 A1*  4/2009  Tsukashima ........... H02K 5/225
                                             310/215
2013/0214620 A1  8/2013  Kobayashi et al.
2020/0014272 A1*  1/2020  Asahi ..................... H02K 3/522
2020/0059129 A1*  2/2020  Yamashita ........... H02K 15/095

FOREIGN PATENT DOCUMENTS

| | | |
|---|---|---|
| JP | 2002-330565 A | 11/2002 |
| JP | 2005-304278 A | 10/2005 |
| JP | 2009-024703 A | 2/2009 |
| JP | 2009-247039 A | 10/2009 |
| JP | 2010-206939 A | 9/2010 |
| JP | 2016-067190 A | 4/2016 |
| WO | 2018/180640 A1 | 10/2018 |

OTHER PUBLICATIONS

Yamashita et al., "Rotor and Motor", U.S. Appl. No. 16/487,221, filed Aug. 20, 2019.

* cited by examiner

MOTOR INCLUDING A HOLDING MEMBER SUPPORT PORTION WHICH SUPPORTS PORTIONS OF A BUS BAR

CROSS REFERENCE TO RELATED APPLICATIONS

This is a U.S. national stage of PCT Application No. PCT/JP2018/010601, filed on Mar. 16, 2018, and priority under 35 U.S.C. § 119(a) and 35 U.S.C. § 365(b) is claimed from U.S. Provisional Application No. 62/479,488, filed Mar. 31, 2017, and Japanese Application No. 2017-191095, filed Sep. 29, 2017; the entire disclosures of each application are hereby incorporated herein by reference.

1. FIELD OF THE INVENTION

The present disclosure relates to a motor.

2. BACKGROUND

Rotary electric machines having bus bars are known. For example, in a related art, there is a rotary electric machine with a power distribution cable as a bus bar.

SUMMARY

There is a case in which such a bus bar is held by being fitted between a pair of wall portions provided in a holding member such as an insulator. In this case, when the bus has, for example, a curved shape, it may be difficult to fit the bus bar between the pair of wall portions due to a dimensional error of the bus bar. Therefore, a time required to assemble a motor may increase.

To address the above problem, example embodiments of the present disclosure provide motors that improve assemblability.

A motor according to an example embodiment of the present disclosure includes a rotor including a shaft provided along a central axis; a stator including a plurality of coils, the stator provided to face the rotor and spaced by a gap from the rotor in a radial direction, a first bus bar electrically connected to the stator at one side in an axial direction; and a holder to hold the first bus bar. The first bus bar includes a first extension extending in a first direction perpendicular to the axial direction; a second extension extending in a second direction from an end of the first extension in the first direction, the second direction being perpendicular or substantially perpendicular to the axial direction and intersecting the first direction; and a first bus bar body including a first corner to which the first extension and the second extension are connected. The holder includes a support to support the first bus bar body from another side in the axial direction; a pair of first walls extending parallel or substantially parallel in a first perpendicular direction and to which the first extension is fitted in the first perpendicular direction, the first perpendicular direction being perpendicular or substantially perpendicular to the axial direction and intersecting the first direction in which the first extension extends; and a pair of second walls extending parallel or substantially parallel in a second perpendicular direction and to which the second extension is fitted in the second perpendicular direction, the second perpendicular direction being perpendicular or substantially perpendicular to the axial direction and intersecting the second direction in which the second extension extends. The pair of first walls include wall surfaces which face each other in the first perpendicular direction while and spaced by a gap from each other and extending in the first direction. The pair of second walls include wall surfaces facing each other in the second perpendicular direction and spaced by a gap from each other, and extending in the second direction. A first space is provided between the pair of first walls and the pair of second walls. The first corner is provided in the first space.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is a vertical direction with a positive side as an upper side and a negative side as a lower side. A central axis J appropriately illustrated in each drawing is an imaginary line which is parallel to the Z-axis direction and extends in the vertical direction. In the following description, an axial direction of the central axis J, i.e., a direction parallel to the vertical direction, is referred to simply as the "axial direction", a radial direction centered on the central axis J is referred to simply as the "radial direction", and a circumferential direction centered on the central axis J is referred to simply as the "circumferential direction". In each drawing, the circumferential direction is indicated appropriately by an arrow θ.

A positive side of the Z-axis direction in the axial direction is referred to as an "upper side" and a negative side thereof in the axial direction is referred to as a "lower side". In a present example embodiment, the upper side corresponds to one side in the axial direction and the lower side corresponds to another side in the axial direction. Furthermore, a counterclockwise side in the circumferential direction when viewed from top to bottom, i.e., a side in a direction indicated by the arrow θ, is referred to as "one side in the circumferential direction". A clockwise side in the circumferential direction when viewed from top to bottom, i.e., a side opposite to the direction indicated by the arrow θ, is referred to as "another side in the circumferential direction".

In addition, the vertical direction, the upper side, and the lower side are terms used to simply describe a relative positional relationship between components and thus an actual positional relationship between components may be different from the positional relationship represented by the terms.

Figure 1:
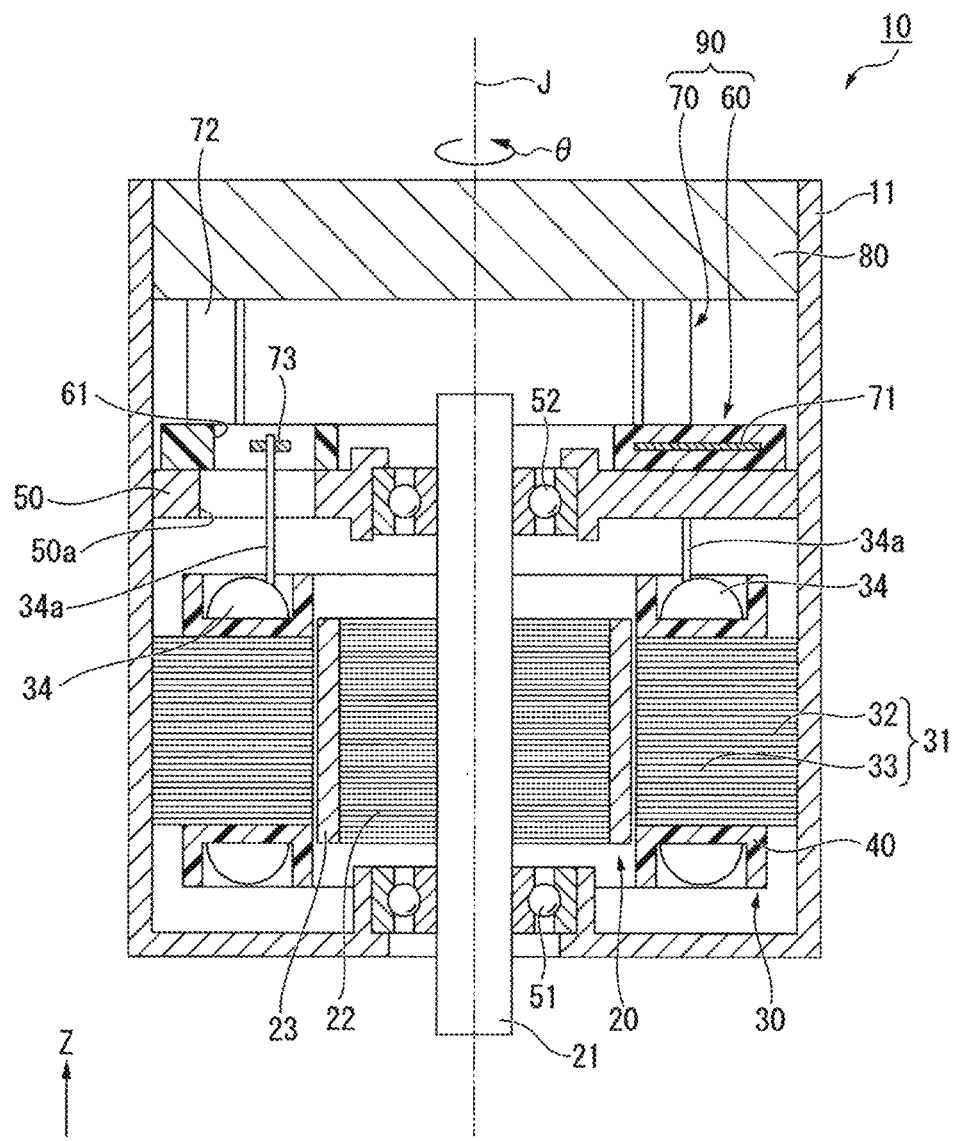
FIG. 1 is a cross-sectional view of a motor according to an example embodiment of the present disclosure.
Figure 2:
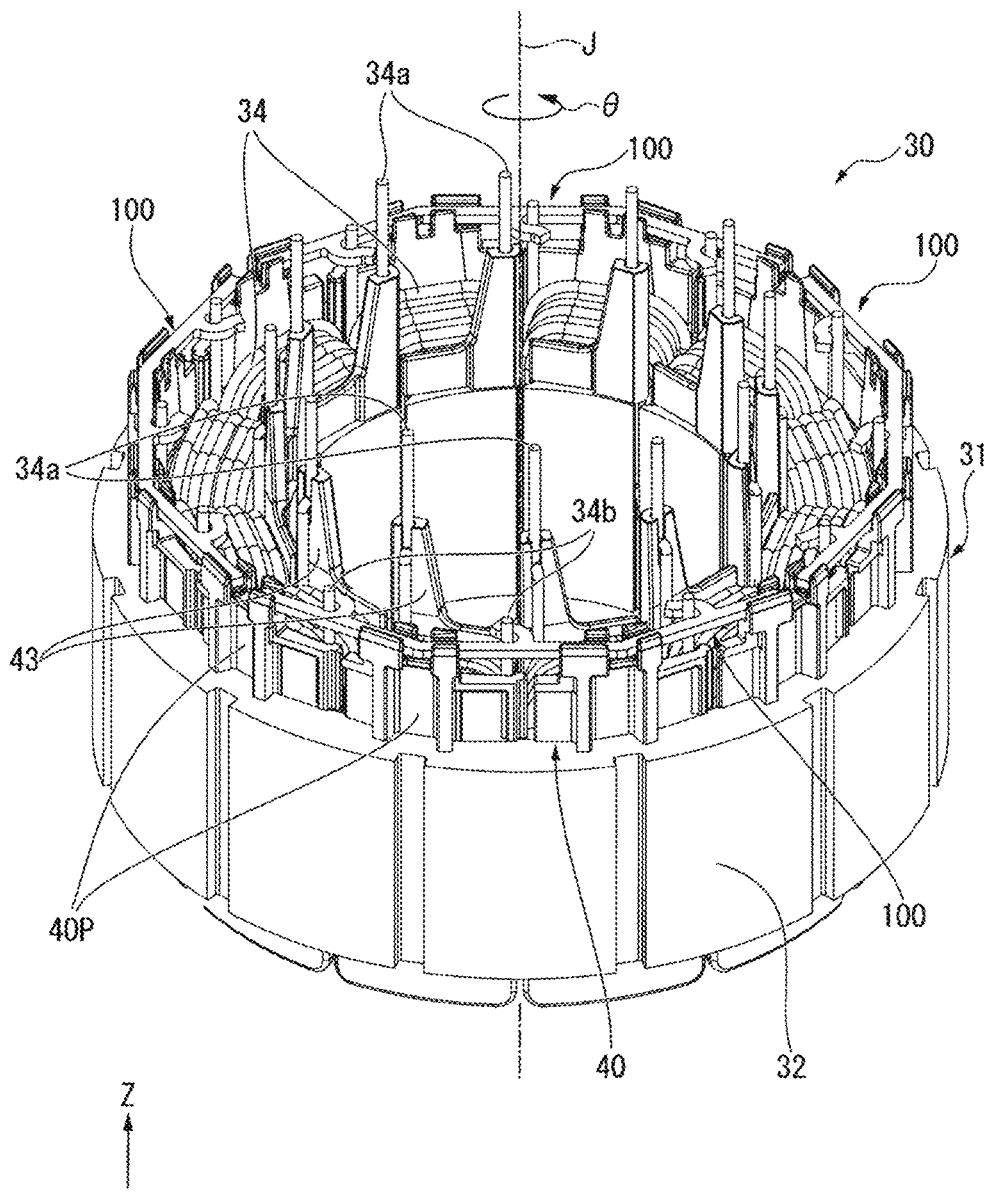
FIG. 2 is a perspective view of a stator and a first bus bar according to an example embodiment of the present disclosure.

As illustrated in FIGS. 1 and 2, a motor 10 according to a present example embodiment includes a housing 11, a rotor 20, bearings 51 and 52, a stator 30, a first bus bar 100, a bearing holder 50, a bus bar unit 90, and a control device 80. The bus bar unit 90 includes a bus bar holder 60 and a second bus bar 70. As illustrated in FIG. 1, the housing 11 accommodates the components of the motor 10. The housing 11 has a cylindrical shape centered on the central axis J. The housing 11 holds the bearing 51 at the bottom of a lower side of the housing 11.

The rotor 20 includes a shaft 21, a rotor core 22, and a magnet 23. The shaft 21 is provided along the central axis J. The shaft 21 is rotatably supported by the bearings 51 and 52. The rotor core 22 has an annular shape fixed on an outer circumferential surface of the shaft 21. The magnet 23 is fixed on an outer circumferential surface of the rotor core 22. The bearing 51 supports the shaft 21 to be rotatable at a lower side of the rotor core 22. The bearing 52 supports the shaft 21 to be rotatable at an upper side of the rotor core 22. The bearings 51 and 52 are ball bearings.

The stator 30 faces the rotor 20 while having a gap with the rotor 20 in the radial direction. The stator 30 surrounds an outer side of the rotor 20 in the radial direction. The stator 30 includes a stator core 31, a plurality of coils 34, and an insulator 40. That is, the motor 10 includes the stator core 31, the coils 34, and the insulator 40. In FIG. 1, the insulator 40 is schematically illustrated. The stator core 31 includes a core back 32 and a plurality of teeth 33. As illustrated in FIG. 2, the core back 32 extends in the circumferential direction. In more detail, the core back 32 has a cylindrical shape centered on the central axis J.

Figure 3:
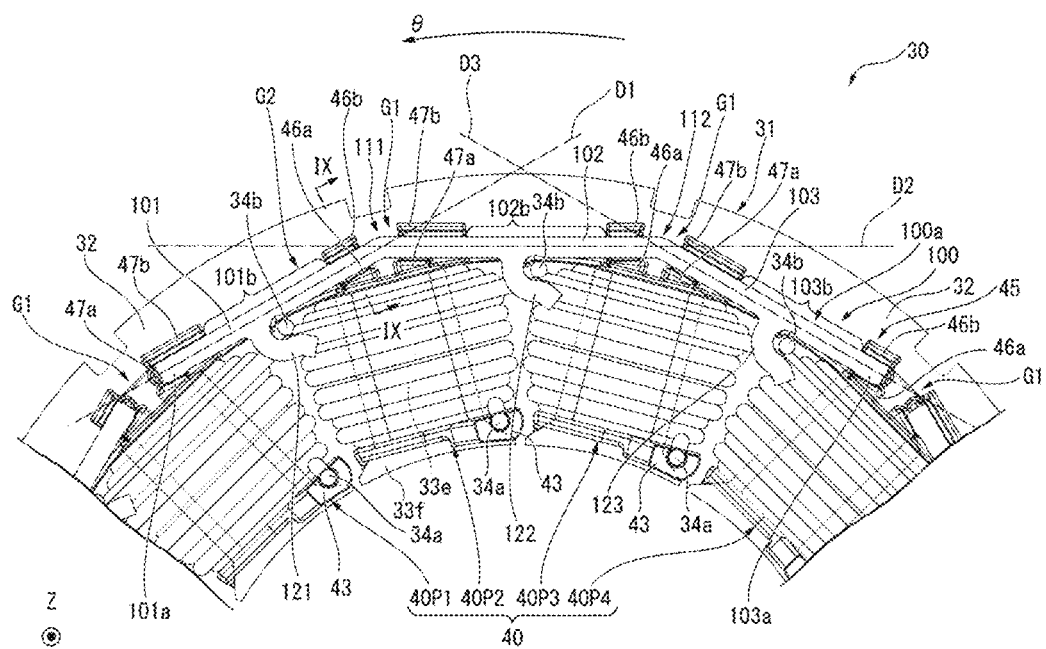
FIG. 3 is a top view of a portion of a stator and a first bar of the present example embodiment of the present disclosure.

As illustrated in FIG. 3, the teeth 33 extend from the core back 32 in the radial direction. In more detail, the teeth 33 extend radially inward from an inner side of the core back 32 in the radial direction. The teeth 33 are arranged at the same interval along the circumferential direction. For example, twelve teeth 33 are provided.

The teeth 33 include a teeth body 33e and an umbrella part 33f. The teeth body 33e extends inward from an inner side of the core back 32 in the radial direction. The umbrella part 33f is connected to an inner end portion of the teeth body 33e in the radial direction. The umbrella part 33f protrudes further to both sides in the circumferential direction than the teeth body 33e.

The coils 34 are provided around the teeth 33 via the insulator 40. The coils 34 are configured by winding conducting wires about the teeth 33 via the insulator 40. For example, twelve coils 34 are provided.

Figure 4:
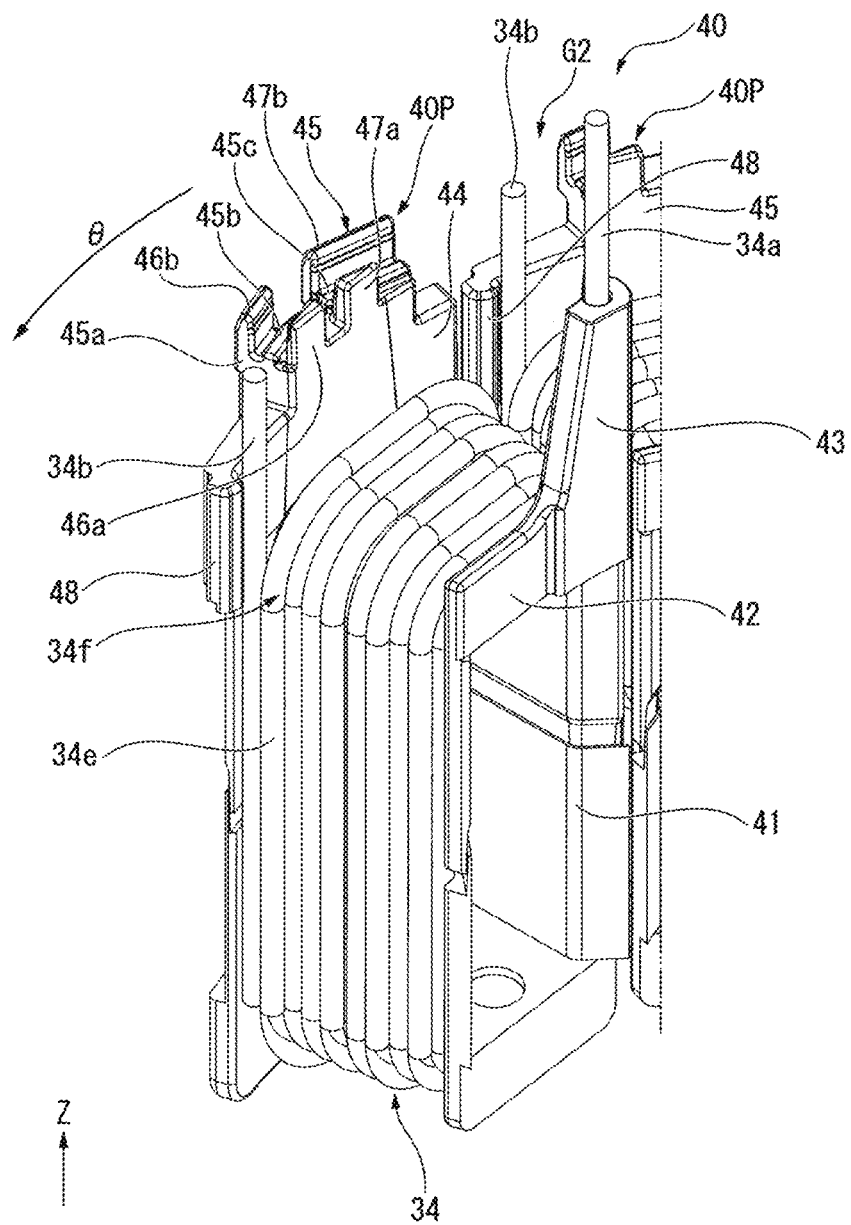
FIG. 4 is a perspective view of an insulator piece according to an example embodiment of the present disclosure.

As illustrated in FIG. 4, in the present example embodiment, the coils 34 are configured by winding conducting wires in a rectangular frame shape with rounded corner portions. An outer diameter of the coils 34 is greatest at an outermost conducting wire 34e wound around an outermost circumference of the teeth 33 among the conducting wires of the coils 34. The outermost conducting wire 34e is an outer portion of the coils 34 in the radial direction. The outermost conducting wire 34e is located further radially inward than an outer end of the coils 34 in the radial direction. The outermost conductive wire 34e is in a rectangular frame shape with rounded corner portions.

Coil lead wires 34a and 34b are drawn upward from each of the coils 34. The coil lead wires 34a and 34b are conducting wires extending upward from each of the coils 34 and corresponding to end portions of the conducting wire of each of the coils 34. The coil lead wire 34a corresponds to an end of a start side of the conducting wire of each of the coils 34 which is wound. The coil lead wire 34b corresponds to an end of an end side of the conducting wire of each of the coils 34 which is wound. The coil lead wire 34a is electrically connected to the second bus bar 70. The coil lead wire 34b is electrically connected to the first bus bar 100.

As illustrated in FIGS. 2 and 3, the insulator 40 is mounted on the stator core 31. In the present example embodiment, the insulator 40 is a holding member configured to hold the first bus bar 100. The insulator 40 includes a plurality of insulator pieces 40P. The insulator pieces 40P are each disposed in the circumferential direction and attached to one of the teeth 33. In the present example embodiment, the insulator pieces 40P are separate members from each other. The insulator pieces 40P have the same shape. As illustrated in FIG. 4, the insulator piece 40P is configured, for example, by connecting two separate members in the axial direction.

The insulator piece 40P includes a tubular part 41, an inner protruding part 42, a wire holding part 43, an outer protruding part 44, a bus bar holding part 45, and a pressing part 48. That is, the insulator 40 includes the tubular part 41, the inner protruding part 42, the wire holding part 43, the outer protruding part 44, the bus bar holding part 45, and the pressing part 48.

Figure 5:
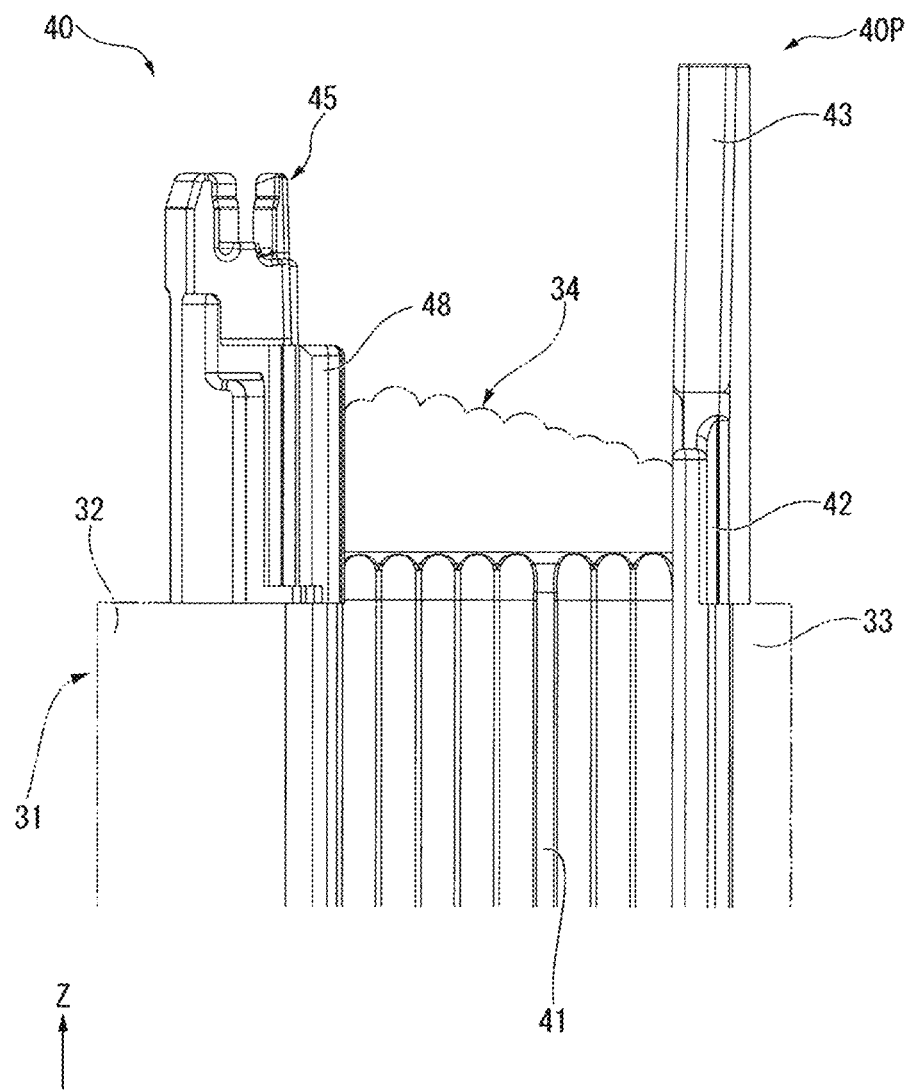
FIG. 5 is a view of a portion of an insulator piece of present example embodiment of the present disclosure when viewed from a point at one side in a circumferential direction.

The tubular part 41 has a tubular shape extending in the radial direction. More specifically, the tubular part 41 is a rectangular tube shape. As illustrated in FIG. 5, the teeth 33 penetrate the tubular part 41. The teeth body 33e is inserted into the tubular part 41. The coil 34 is wound around an outer circumference of the tubular part 41. Thus, the tubular part 41 is provided with the coil 34. As illustrated in FIG. 4, the inner protruding part 42 protrudes upward from an upper edge of an inner end of the tubular part 41 in the radial direction. The inner protruding part 42 is provided on an upper side of the umbrella part 33f. Alternatively, a portion of an outer circumferential surface of the teeth 33 may not be covered with the tubular part 41. In this case, for example, a gap may be formed between the two separate components of the insulator piece 40P, and the outer circumferential surface of the tooth 33 may be exposed to the outside of the tubular part 41 via the gap.

The wire holding part 43 extends upward from a portion of the inner protruding part 42 at the other side in the circumferential direction. In the present example embodiment, the wire holding part 43 extends upward from an end of the inner protruding part 42 at the other side in the circumferential direction. Thus, the wire holding part 43 is connected to an inner end of the tubular part 41 in the radial direction via the inner protruding part 42 and protrudes further upward than the tubular part 41. The wire holding part 43 has a substantially quadrangular prism shape. The size of the wire holding part 43 in the circumferential direction decreases from bottom to top. Alternatively, the wire holding part 43 may extend upward from a portion of the inner protruding part 42 at the one side in the circumferential direction. Alternatively, the wire holding part 43 may extend upward from an end of the inner protruding part 42 at the one side in the circumferential direction.

Figure 6:
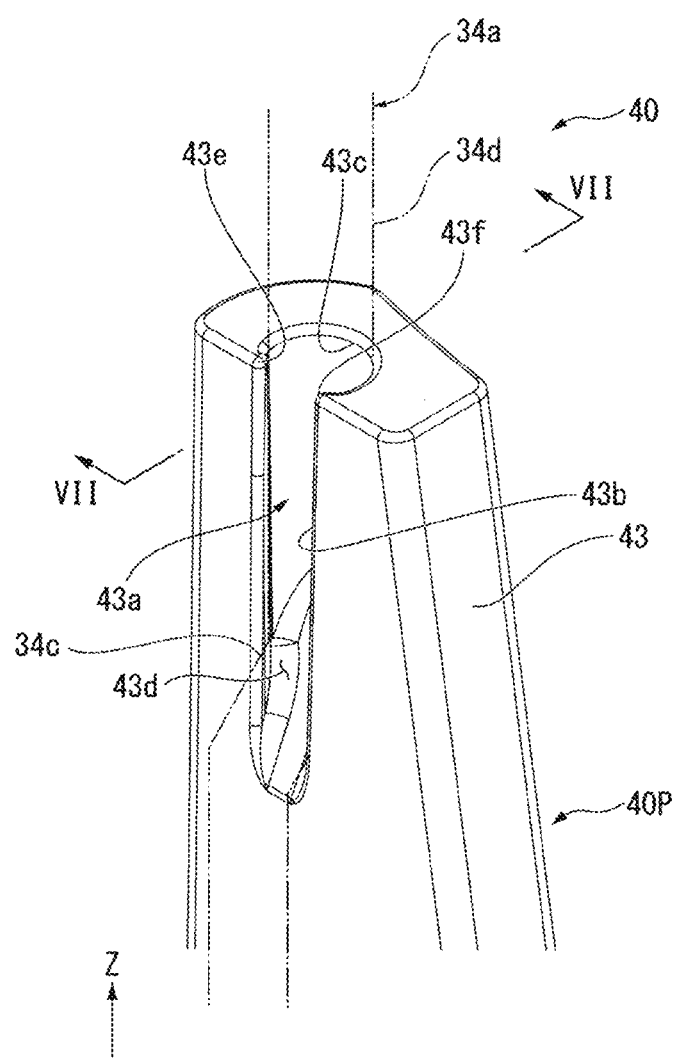
FIG. 6 is a perspective view of a wire holding part according to an example embodiment of the present disclosure.

As illustrated in FIG. 6, the wire holding part 43 includes a holding groove 43a. The coil lead wire 34a is held by the holding groove 43a. The holding groove 43a is recessed inward from an outer surface of the wire holding part 43 in the radial direction and extends in the axial direction. The holding groove 43a includes a first opening 43b and a second opening 43c. The first opening 43b is open outward in the radial direction. The first opening 43b extends in the axial direction. The first opening 43b has a rectangular shape that elongated in the axial direction. An upper end of the first opening 43b is connected to the second opening 43c. The second opening 43c is open upward at an upper end of the holding groove 43a. That is, the upper end of the holding groove 43a is open. The second opening 43c has a substantially circular shape. A lower end of the holding groove 43a is closed.

An inner edge of a cross section of the holding groove 43a perpendicular to the axial direction has a circular arc shape. An inner diameter of the holding groove 43a is larger than a width of the first opening 43b. The width of the first opening 43b refers to a size of the first opening 43b in the axial direction in which the first opening 43b extends and a direction perpendicular to both sides of the radial direction in which the first opening 43b is open. The width of the first opening 43b is uniform over an entirety of the axial direction in a state in which the coil lead wire 34a is not held and is less than an outer diameter of the coil lead wire 34a. The width of the second opening 43c is greater than the outer diameter of the coil lead wire 34a. The width of the second opening 43c is the inner diameter of the upper end of the holding groove 43a.

Figure 7:
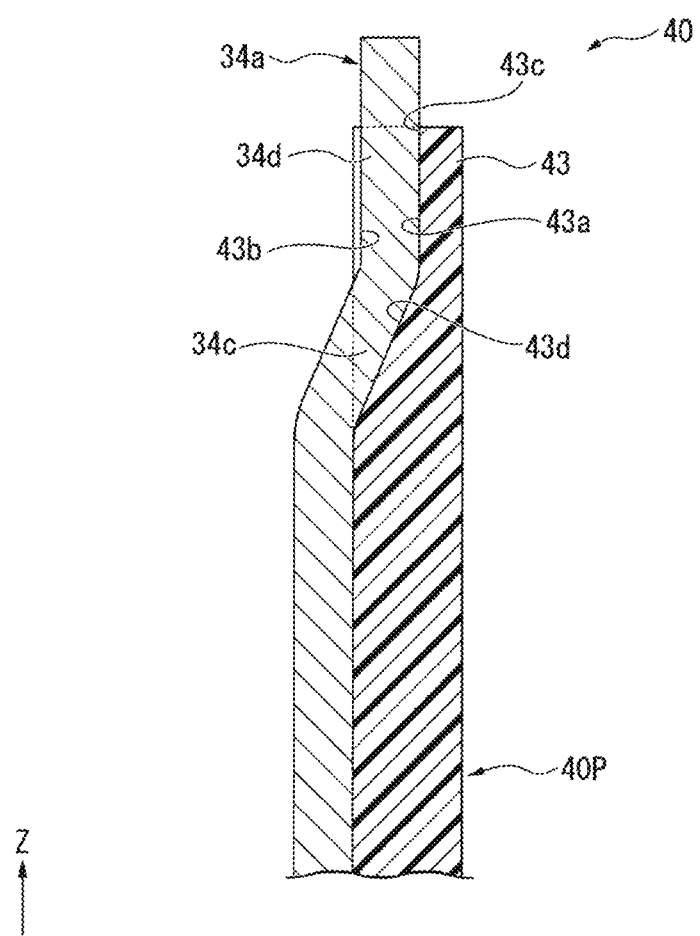
FIG. 7 is a cross-sectional view of the wire holding part of the present example embodiment of the present disclosure taken along line VII-VII of FIG. 6.

As illustrated in FIGS. 6 and 7, a lower portion of a bottom surface of the holding groove 43a is an inclined portion 43d which faces downward and thus is disposed outward in the radial direction. A lower end of the inclined portion 43d is connected to an outer surface of the wire holding part 43 in the radial direction.

The coil lead wire 34a held by the holding groove 43a has a first portion 34c and a second portion 34d. The first portion 34c is a portion inserted into a lower portion of the first opening 43b. The second portion 34d is connected to a front end, i.e., an upper side, of the first portion 34c. The second portion 34d is a portion protruding from the second opening 43c to the outside of the holding groove 43a via the inside of the holding groove 43a.

As described above, the width of the first opening 43b is less than the outer diameter of the coil lead wire 34a in the state in which the coil lead wire 34a is not held. Thus, when the first portion 34c of the coil lead wire 34a is inserted into the first opening 43b, both edges 43e and 43f of the first opening 43b in the circumferential direction are partially elastically deformed and the width of the first opening 43b is partially expanded. Thus, when elastically deformed, the both edges 43e and 43f of the first opening 43b in the circumferential direction come into contact with the first portion 34c, and thus the first portion 34c is fitted therebetween. Accordingly, the coil lead wire 34a may be firmly fixed in the holding groove 43a.

The width of the second opening 43c is greater than the outer diameter of the coil lead wire 34a. Thus, a gap is formed between the second portion 34d passing through the second opening 43c and an inner edge of the second opening 43c. Accordingly, the coil lead wire 34a may be guided upward along the holding groove 43a to dispose the coil lead wire 34a and the position of the coil lead wire 34a is finely adjusted by the gap between the inner edge of the second opening 43c and the coil lead wire 34a. Therefore, it is easy to connect the coil lead wire 34a to another member. In the present example embodiment, the other member may be the second bus bar 70.

The width of the first opening 43b is increased at or near the portion into which the first portion 34c is inserted, thus becoming equal to the outer diameter of the first portion 34, but the other portions of the first opening 43b are less than the outer diameter of the outer diameter of 34c. Thus, at the upper end of the holding groove 43a, the width of the first opening 43b is less than the outer diameter of the coil lead wire 34a. Therefore, the second portion 34d accommodated in the holding groove 43a may be suppressed from being separated from the first opening 43b and escaping to the outside of the holding groove 43a.

Furthermore, the upper end of the first opening 43b is connected to the second opening 43c. Thus, a worker may easily hold the coil lead wire 34a in the holding groove 43a by disposing the coil lead wire 34a, which extends further upward than an inner side of the conductor holding part 43 in the radial direction, inward in the radial direction to be inserted into the holding groove 43a from the first opening 43b.

As described above, according to the present example embodiment, the motor 10 configured to easily and firmly hold the coil lead wire 34a and finely adjust the position of the coil lead wire 34a may be achieved.

According to the present example embodiment, the lower portion of the bottom surface of the holding groove 43a is the inclined portion 43d which faces downward to be outward in the radial direction. Thus, as illustrated in FIG. 7, the coil lead wire 34a may be provided along the inclined portion 43d. Therefore, when held in the holding groove 43a, the coil lead wire 34a may be easily held in the holding groove 43a without bending the coil lead wire 34a to a large extent.

According to the present example embodiment, an inner edge of a cross section of the holding groove 43a which is perpendicular to the axial direction has a circular arc shape. Thus, the inner side of the holding groove 43a may be provided along an outer circumferential surface of the second portion 34d accommodated in the holding groove 43a. Accordingly, the second portion 34d may be stably held inside the holding groove 43a, and the coil lead wire 34a may be accurately disposed.

As illustrated in FIG. 4, the outer protruding part 44 protrudes upward from an upper edge of an outer end of the tubular part 41 in the radial direction. The outer protruding part 44 extends beyond the tubular part 41 to the one side in the circumferential direction. More specifically, the outer protruding part 44 extends to both sides in the circumferential direction further than the tubular part 41. In the present example embodiment, the outer protruding part 44 is a portion of a flange part extending outward from an entire outer circumference of an end of the tubular part 41 in the radial direction.

The bus bar holding part 45 includes a base portion 45a, support portions 45b and 45c, a pair of wall portions 46a and 46b, and a pair of wall portions 47a and 47b. That is, the insulator 40 includes the base portion 45a, the support portions 45b and 45c, the pair of wall portions 46a and 46b, and the pair of wall portions 47a and 47b. The base portion 45a protrudes upward from the outer protruding part 44. The base portion 45a has a substantially rectangular parallelepiped shape extending in the circumferential direction. A center of the base portion 45a in the circumferential direction is located closer to the other side in the circumferential direction than a center of the tubular part 41 in the circumferential direction.

Figure 8:
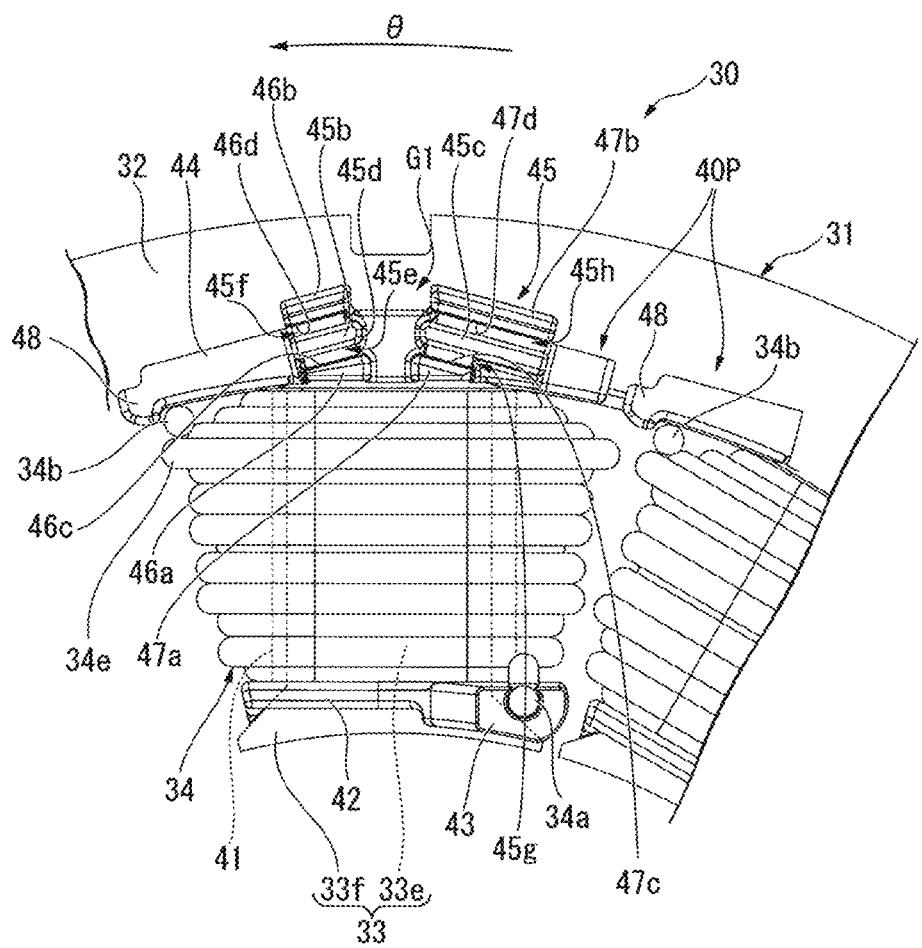
FIG. 8 is a top view of a portion of the stator of the present example embodiment of the present disclosure.

The support portion 45b protrudes upward from a portion of an upper end of the base portion 45a at the one side in the circumferential direction. As shown in FIG. 8, the support portion 45b is located closer to the one side in the circumferential direction than the center of the tubular part 41 in the circumferential direction. The support portion 45b linearly extends in a direction perpendicular to the axial direction. The direction in which the support portion 45b extends is toward the one side in the circumferential direction and thus is a direction inward in the radial direction in which the teeth 33, to which the insulator pieces 40P are attached, extend. A direction parallel to the direction in which the support portion 45b extends will be referred to as a "first extension direction".

Figure 9:
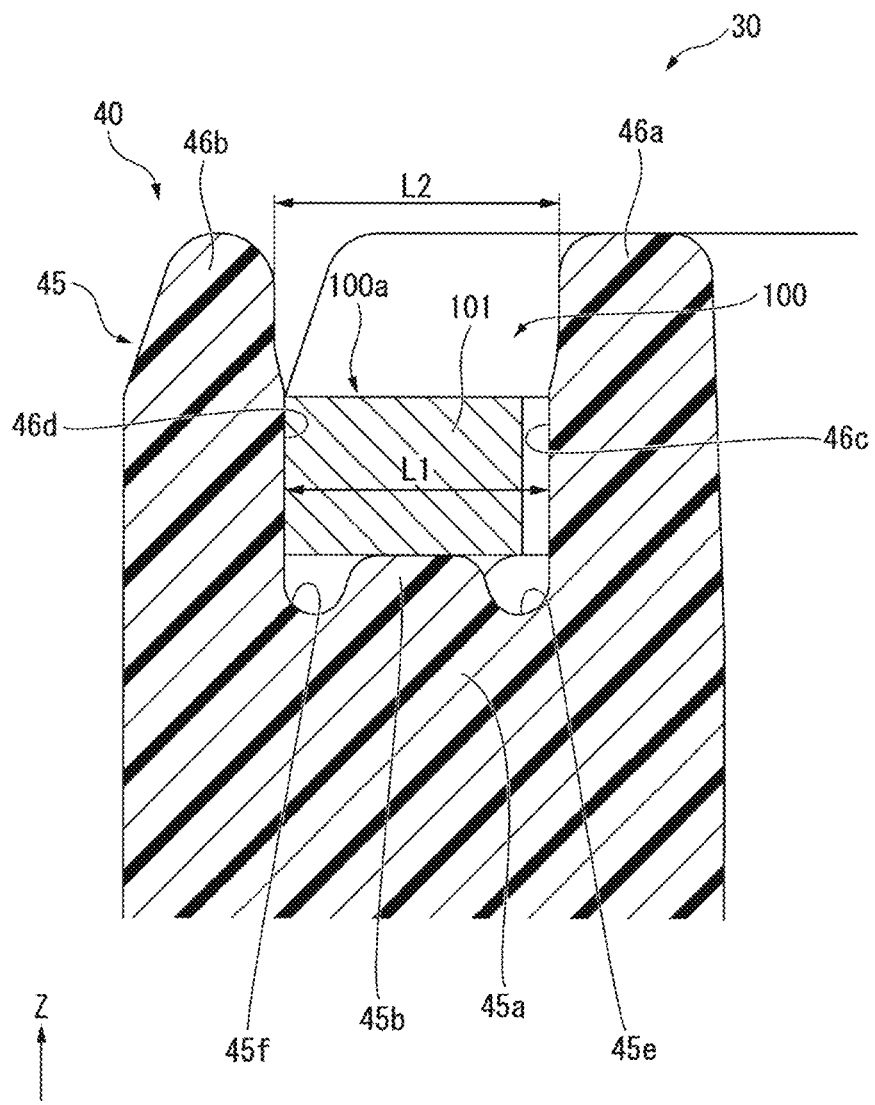
FIG. 9 is a cross-sectional view of a portion of the insulator and a portion of the first bus bar of the present example embodiment of the present disclosure taken along line IX-IX of FIG. 3.

The support portion 45b extends from a portion of the upper end of the base portion 45a near the one side in the circumferential direction to an end of the base portion 45a at the one side in the circumferential direction. As shown in FIG. 9, a cross section of the support portion 45b perpendicular to the first extension direction has a substantially trapezoidal shape having an upper end smaller than a lower end thereof. Both edges of the upper end of the support 45b in the direction perpendicular to the first extension direction are round. The support portion 45b supports a first bus bar body 100a, which will be described below, from below.

As shown in FIG. 4, the support portion 45c protrudes upward from a portion of the upper end of the base portion 45a at the other side in the circumferential direction. As shown in FIG. 8, the support portion 45c is located closer to the other side in the circumferential direction than the center of the tubular part in the circumferential direction. Among directions perpendicular to the axial direction, the support portion 45c linearly extends in a direction intersecting the first extension direction of the support portion 45b. The direction in which the support portion 45c extends is toward the other side in the circumferential direction and thus is a direction inward in the radial direction in which the teeth 33 to which the insulator pieces 40P are attached extend. A direction parallel to the direction in which the support portion 45c extends will be referred to as a "second extension direction."

The support portion 45c extends from a central portion of the upper end of the base portion 45a in the circumferential direction to the end thereof at the other side in the circumferential direction. Although not shown, a cross section of the support portion 45c perpendicular to the second extension direction has, for example, the same shape as that of the support 45b. The support portion 45c supports the first bus bar body 100a which will be described below from below. A length of extension of the support portion 45c is greater than that of extension of the support portion 45b.

As illustrated in FIG. 4, the wall portion 46a protrudes upward from an inner edge of the upper end of the base portion 45a in the radial direction at the one side in the circumferential direction. The wall portion 46b protrudes upward from an edge of the upper end portion of the base portion 45a in the radial direction at the one side in the circumferential direction. The wall portion 46a is located at an inner side of the support portion 45b in the radial direction. The wall portion 46b is located at an outer side of the support portion 45b in the radial direction. The pair of wall portions 46a and 46b extend in the first extension direction. As illustrated in FIG. 8, a length of extension of the wall portion 46a and the length of extension of the wall portion 46b are substantially the same as that of the extension of support portion 45b.

The pair of wall portions 46a and 46b are perpendicular to the axial direction and located in parallel in a direction intersecting the first extension direction. The direction in which the pair of wall portions 46a and 46b are located will be referred to as a first insertion and support direction. In the present example embodiment, the first insertion and support direction is perpendicular to the axial direction and both sides in the first extension direction. The support portion 45b is fitted to the pair of wall portions 46a and 46b in the first insertion and support direction. That is, the support portion 45b is located between the pair of wall portions 46a and 46b. A wall surface 46c of the wall portion 46a at the support portion 45b extends in the first extension direction. A wall surface 46d of the wall portion 46b at the support portion 45b extends in the first extension direction. The wall surface 46c and the wall surface 46d face each other while having a gap therebetween. That is, the pair of wall portions 46a and 46b respectively include the wall surfaces 46c and 46d which are located to face each other while having a gap therebetween, and which extend in the first extension direction.

As illustrated in FIG. 9, a distance L2 between an upper side of the wall surface 46c and an upper side of the wall surface 46d is greater than a distance L1 between a lower side of the wall surface 46c and a lower side of the wall surface 46d. Thus, a distance between the pair of wall portions 46a and 46b increases in an upward direction.

As illustrated in FIG. 4, the wall portion 47a protrudes upward from an inner edge of the upper end of the base portion 45a in the radial direction at the other side in the circumferential direction. The wall portion 47a is located at a radially inner side of the support portion 45c at the one side in the circumferential direction. The wall portion 47a is not provided at a radially inner side of the support portion 45c at the other side in the circumferential direction. The wall portion 47b protrudes upward from an outer edge of the upper end of the base portion 45a in the radial direction at the other side in the circumferential direction. The wall portion 47b is located at an outer side of the support portion 45c in the radial direction.

The pair of wall portions 47a and 47b extend in the second extension direction. As illustrated in FIG. 8, a length of extension of the wall portion 47a is less than that of extension of the support portion 45c. A length of extension of the wall portion 47b is greater than those of extension of the wall portions 46a, 46b, and 47a. The length of extension of the wall portion 47b is substantially the same as that of extension of the support portion 45c. The wall portion 47a has substantially the same shape as the wall portion 46a except that the wall portion 47a is symmetric in the circumferential direction.

The pair of wall portions 47a and 47b are perpendicular to the axial direction and disposed in parallel in a direction intersecting the second extension direction. The direction in which the pair of wall portions 47a and 47b are disposed will be referred to as a second insertion and support direction. In the present example embodiment, the second insertion and support direction is perpendicular to the axial direction and both sides in the second extension direction. The support portion 45c is fitted to the pair of wall portions 47a and 47b in the second insertion and support direction. That is, the support portion 45c is located between the pair of wall portions 47a and 47b. A wall surface 47c of the wall portion 47a at the support portion 45c extends in the second extension direction. A wall surface 47d of the wall portion 47b at the support portion 45c extends in the second extension direction. The wall surface 47c and the wall surface 47d face each other while having a gap therebetween. That is, the pair of wall portions 47a and 47b respectively include the wall surfaces 47c and 47d which face each other while having a gap therebetween and which extend in the second extension direction. Although not shown, a distance between the pair of wall portions 47a and 47b increases in an upward direction, similar to the wall portions 46a and 46b.

In one insulator piece 40P, a space G1 is formed between the wall portions 46a and 46b and the wall portions 47a and 47b. The support portion 45b and the support portion 45c are disposed apart from each other by the space G1 in the circumferential direction. The wall portions 46a and 46b and the wall portions 47a and 47b are disposed apart from each other by the space G1 in the circumferential direction. In the present example embodiment, the space G1 includes a space between the support portion 45b and the support portion 45c in the circumferential direction and a space between the wall portions 46a and 46b and the wall portions 47a and 47b in the circumferential direction. The space G1 penetrates the bus bar holding part 45 in the radial direction. The space G1 is open upward and to both sides in the radial direction. The space G1 is provided at a location in the circumferential direction corresponding to the center of the tubular part 41 in the circumferential direction.

As illustrated in FIG. 3, the first extension direction, in which the support portion 45b and the pair of wall portions 46a and 46b extend, is parallel to the second extension direction, in which the support portion 45c and the pair of wall portions 47a and 47b of the insulator piece 40P adjacent to the one side in the circumferential direction extend. The support portion 45c and the pair of wall portions 47a and 47b of the insulator piece 40P adjacent to the one side in the circumferential direction are provided on a line of extension of the support portion 45b and the pair of wall portions 46a and 46b.

Among a pair of insulator pieces 40P adjacent to the circumferential direction, a space G2 is formed between the wall portions 47a and 47b of the insulator piece 40P at the one side in the circumferential direction and the wall portions 46a and 46b of the insulator piece 40P at the other side in the circumferential direction. The wall portions 47a and 47b of the insulator piece 40P at the one side in the circumferential direction and the wall portions 46a and 46b of the insulator piece 40P at the other side in the circumferential direction are disposed apart from each other by the space G2 in the circumferential direction.

As illustrated in FIG. 4, the space G2 includes a space in the circumferential direction between the bus bar holding parts of a pair of insulator pieces 40P adjacent in the circumferential direction. The space G2 is open upward and to both sides in the radial direction. A size of the space G2 in the circumferential direction is greater than that of the space G1 in the circumferential direction.

Figure 10:
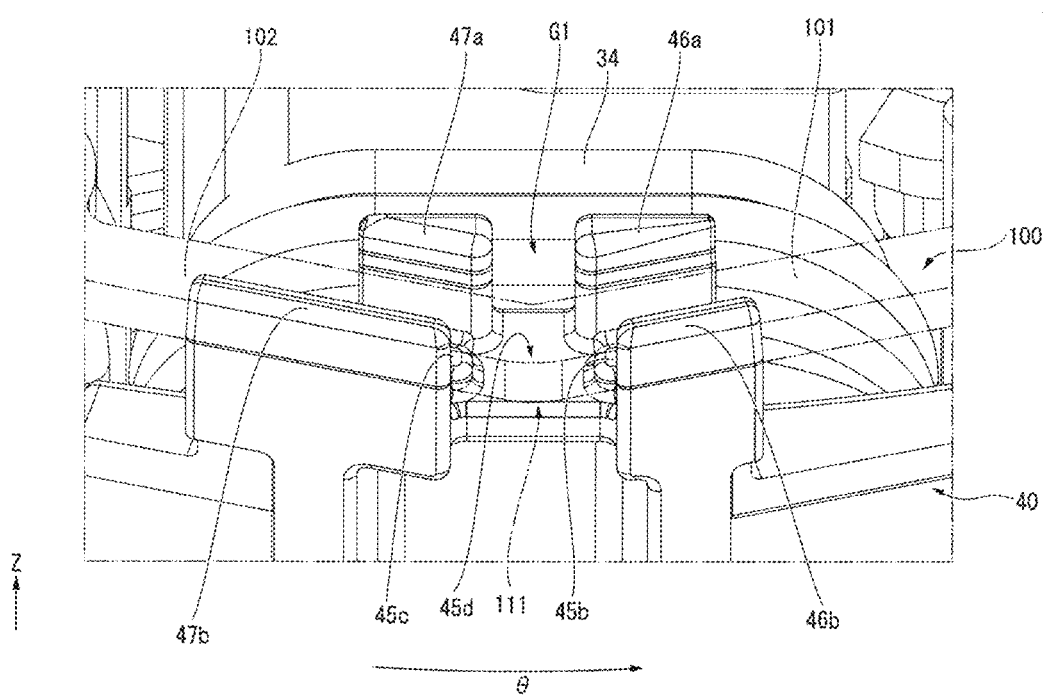
FIG. 10 is a perspective view of a portion of the insulator and a portion of the first bus bar of the present example embodiment of the present disclosure.

As illustrated in FIG. 10, the support portion 45b and the support portion 45c are disposed apart from each other by the space G1 in the circumferential direction and thus a recess 45d is recessed downward between the support portion 45b and the support portion 45c. That is, the insulator 40 includes the recess 45d. The recess 45d is open to both sides in the radial direction. The inside of the recess 45d is included, for example, in the space G1.

As illustrated in FIG. 8, the bus bar holding part 45 includes grooves 45e, 45f, 45g, and 45h. That is, the insulator 40 includes the grooves 45e, 45f, 45g, and 45h. As illustrated in FIG. 9, the groove 45e is recessed downward between the wall portion 46a and the support portion 45b. The groove 45f is recessed downward between the wall portion 46b and the support portion 45b. As illustrated in FIG. 8, the grooves 45e and 45f extend in the first extension direction. Both ends of the grooves 45e and 45f in the first extension direction are open. The groove 45g is recessed downward between the wall portion 47a and the support portion 45c. The groove 45h is recessed downward between the wall portion 47b and the support portion 45c. The grooves 45g and 45h extend in the second extension direction. Both ends of the grooves 45g and 45h are open in the second extension direction.

The pressing part 48 protrudes radially inward from the outer protruding part 44. More specifically, the pressing part 48 protrudes radially inward from an end of the outer protruding part 44 at the one side in the circumferential direction. The pressing part 48 is closer to the one side in the circumferential direction than the tubular part 41. The pressing part 48 is a portion for pressing the coil lead wire 34b.

The coil lead wire 34b is located between the pressing part 48 and the coil 34 with respect to the pressing part 48 at the other side in the circumferential direction when viewed from the axial direction. Thus, the coil lead wire 34b may be easily fitted between the pressing part 48 and the coil 34 and be suppressed from being separated and escaping from the coil 34. Accordingly, it is easy to connect the coil lead wire 34b corresponding to an end of an end side of the conducting wire of the coil 34 which is wound to the first bus bar 100. Furthermore, because the coil lead wire 34b may be pressed using the coil 34, the shape of the pressing part 48 may be easily simplified. Accordingly, the structure of the insulator 40 may be simplified and the manufacturing cost of the motor 10 may be reduced. As described above, according to the present example embodiment, the motor 10 having a simple structure and including the insulator 40 capable of suppressing the movement of the coil lead wire 34b corresponding to the end side of the coil 34 which is wound is achieved.

In the present example embodiment, the coil lead wire 34b is disposed between the outermost conducting wire 34e and the outer protruding part 44 in the radial direction. When viewed from the axial direction, a distance between an end of the outermost conducting wire 34e at the one side in the circumferential direction and the pressing part 48 is less than the outer diameter of the coil lead wire 34b. Thus, the coil lead wire 34b may be suppressed from escaping from between the outermost conducting wire 34e and the pressing part 48 to the one side in the circumferential direction. Accordingly, the coil lead wire 34b may be further suppressed from being separated and escaping from the coil 34.

As illustrated in FIG. 4, the pressing part 48 extends in the axial direction. Thus, the size of a portion of the coil lead wire 34b supported by the pressing part 48 in the axial direction may be increased. Accordingly, the movement of the coil lead wire 34b may be further suppressed by the pressing part 48. In addition, the coil lead wire 34b may be guided upward along the pressing part 48 and be easily and accurately disposed.

A lower end of the pressing part 48 is at a level lower than a corner portion 34f of an upper side of the outermost conducting wire 34e. A portion of the outermost conducting wire 34e which is lower than the corner portion 34f extends in the axial direction and is an end of the outermost conducting wire 34e at the one side in the circumferential direction. Thus, the pressing part 48 may be extended to be lower than the corner portion 34*f* to cause the end of the outermost conducting wire 34*e* at the one side in the circumferential direction and a portion of the pressing part 48 to face each other in a direction perpendicular to the axial direction. Accordingly, the coil lead wire 34*b* may be more reliably suppressed from escaping from between the end of the outermost conducting wire 34*e* at the one side in the circumferential direction and the pressing part 48 to the one side in the circumferential direction.

As illustrated in FIG. 5, the lower end of the pressing part 48 is located at the same position in the axial direction as the upper surface of the tooth 33 or above the upper surface of the tooth 33. The pressing part 48 may thus be suppressed from being excessively extended downward. Thus, when the coil 34 is manufactured by winding a conducting wire, the conducting wire may be suppressed from interfering with the pressing part 48. Accordingly, the coil 34 is easy to manufacture. In the present example embodiment, the lower end of the pressing part 48 is at the same level as the upper surface of the teeth 33 in the axial direction.

The upper end of the pressing part 48 is located above the coil 34. Thus, the size of the pressing part 48 in the axial direction may be increased and the size of the portion of the coil lead wire 34*b* supported by the pressing part 48 in the axial direction may be further increased. Accordingly, the movement of the coil lead wire 34*b* may be further suppressed by the pressing part 48. Furthermore, the coil lead wire 34*b* may be easily guided upward along the pressing part 48 and may be easily and accurately disposed.

As illustrated in FIG. 2, the first bus bar 100 is located above the stator 30 and electrically connected to the stator 30. In the present example embodiment, the first bus bar 100 is a neutral point bus bar connecting two or more coils 34 as neutral points. The first bus bar 100 has a plate shape having a plate surface perpendicular to the axial direction. Therefore, a size of the first bus bar 100 in the axial direction may be reduced to minimize the size of the motor 10 in the axial direction. The first bus bar 100 extends along a plane perpendicular to the axial direction. In the present example embodiment, for example, four first bus bars 100 are provided. The first bus bars 100 have the same shape.

In the present specification, a thickness direction of each component of a first bus bar and a direction perpendicular to both sides in a direction in which each component extends will be referred to as a "widthwise direction" of each component. In the present example embodiment, the widthwise direction of the first bus bar is perpendicular to the axial direction.

As illustrated in FIG. 3, one first bus bar 100 is supported from a lower side thereof by four adjacent insulator pieces 40P in the circumferential direction. The four insulator pieces 40P supporting the first bus bar 100 will be sequentially referred to as a first insulator piece 40P1, a second insulator piece 40P2, a third insulator piece 40P3, and a fourth insulator piece 40P4 from the one side in the circumferential direction to the other side in the circumferential direction. That is, the insulator pieces 40P are adjacent in the circumferential direction and include the first insulator piece 40P1, the second insulator piece 40P2, the third insulator piece 40P3, and the fourth insulator piece 40P4.

The first bus bar 100 includes a first bus bar body 100*a* and coil connection parts 121, 122, and 123. The first bus bar body 100*a* extends along a plane perpendicular to the axial direction. In the present example embodiment, the first bus bar body 100*a* extends in the form of a line bent along the circumferential direction. In the present specification, the term "form of the line bent along the circumferential direction" includes, for example, a shape along sides of a polygon inscribed in an imaginary circle centered on the central axis J. In the present example embodiment, the first bus bar body 100*a* has a shape along three adjacent sides of a dodecagon inscribed in an imaginary circle centered on the center axis J.

The first bus bar body 100*a* is supported by an outer side of the insulator 40 in the radial direction rather than by the coil 34. The first bus bar body 100*a* is held on the bus bar holding part 45. The first bus bar body 100*a* includes a first extension part 101, a second extension part 102, and a third extension part 103.

The first extension part 101 is held ranging from the first insulator piece 40P1 to the second insulator piece 40P2. The first extension part portion 101 is supported from below by a support portion 45*c* of the first insulator piece 40P1 and a support portion 45*b* of the second insulator piece 40P2. Thus, the first extension part portion 101 ranges from the support portion 45*c* of the first insulator piece 40P1 to the support portion 45*b* of the second insulator piece 40P2. That is, the first bus bar body 100*a* ranges from the support portion 45*c* of the first insulator piece 40P1 to the support portion 45*b* of the second insulator piece 40P2.

The first extension part 101 extends in a first direction D1 perpendicular to the axial direction. In the present example embodiment, the first direction D1 corresponds to the second extension direction with respect to the first insulator piece 40P1 and the first extension direction with respect to the second insulator piece 40P2.

One end of the first extension part 101 in the first direction D1 is located between the pair of wall portions 47*a* and 47*b* of the first insulator piece 40P1. The end of the first extension part 101 is fitted by the pair of wall portions 47*a* and 47*b* of the first insulator piece 40P1 in a first perpendicular direction perpendicular to the axial direction and intersecting the first direction D1. In the present example embodiment, the first perpendicular direction corresponds to the second insertion and support direction with respect to the first insulator piece 40P1 and the first insertion and support direction with respect to the second insulator piece 40P2. That is, in the present example embodiment, the first perpendicular direction is perpendicular to both sides in the axial direction and the first direction D1. The end of the first extension part 101 in the first direction D1 corresponds to an end of the first extension part 101 at the one side in the circumferential direction and an end of the first bus bar body 100*a* at the one side in the circumferential direction.

The end of the first extension part 101 in the first direction D1 is a width-increased portion 101*a*, the size of which increases in the first perpendicular direction. Thus, a gap between the first extension part 101 and the pair of wall portions 47*a* and 47*b* may be reduced between the pair of wall portions 47*a* and 47*b*. Accordingly, the first bus bar 100 may be more stably held by the insulator 40. A surface of the end of the first extension part 101 in the first direction D1 is exposed via the space G1 of the first insulator piece 40P1.

Another end of the first extension part 101 in the first direction D1 is connected to the second extension part 102. That is, the one end, i.e., the width-increased portion 101*a*, of the first extension part 101 in the first direction D1 is opposite to a side of the first extension part 101 connected to the second extension part 102. The other end of the first extension part 101 in the first direction D1 is located between the pair of wall portions 46*a* and 46*b* of the second insulator piece 40P2. The other end of the first extension part 101 in the first direction D1 is the end thereof at the other side in the circumferential direction.

As described above, in the first perpendicular direction, the first extension part 101 is fitted to not only the pair of wall portions 47a and 47b of the first insulator piece 40P1 but also the pair of wall portions 46a and 46b of the second insulator piece 40P2. That is, in the present example embodiment, the pair of wall portions 47a and 47b of the first insulator piece 40P1 and the pair of wall portions 46a and 46b of the second insulator piece 40P2 are a pair of first wall portions to which the first extension part 101 is fitted in the first perpendicular direction.

The second extension part 102 is held ranging from the second insulator piece 40P2 to the third insulator piece 40P3. The second extension part 102 is supported from below by the support portion 45c of the second insulator piece 40P2 and the support portion 45b of the third insulator piece 40P3. Thus, the second extension part 102 ranges from the support portion 45c of the second insulator piece 40P2 to the support portion 45b of the third insulator piece 40P3. That is, the first bus bar body 100a ranges from the support portion 45c of the second insulator piece 40P2 to the support portion 45b of the third insulator piece 40P3.

The second extension part 102 extends from the other end of the first extension part 101 of the first direction D1 in a second direction D2 perpendicular to the axial direction and intersecting the first direction D1. In the present example embodiment, the second direction D2 corresponds to the second extension direction with respect to the second insulator piece 40P2 and the first extension direction with respect to the third insulator piece 40P3.

One end of the second extension part 102 in the second direction D2 is located between the pair of wall portions 47a and 47b of the second insulator piece 40P2. The one end of the second extension part 102 in the second direction D2 is fitted by the pair of wall portions 47a and 47b of the second insulator piece 40P2 in a second perpendicular direction perpendicular to the axial direction and intersecting the second direction D2. In the present example embodiment, the second perpendicular direction corresponds to the second insertion and support direction with respect to the second insulator piece 40P2 and the first insertion and support direction with respect to the third insulator piece 40P3. That is, in the present example embodiment, the second perpendicular direction is perpendicular to the axial direction and both sides in the second direction D2. The one end of the second extension part 102 in the second direction D2 is an end thereof at the one side in the circumferential direction. Another end of the second extension part 102 in the second direction D2 is connected to the third extension part 103. The other end of the second extension part 102 in the second direction D2 is located between the pair of wall portions 46a and 46b of third insulator piece 40P3. The other end of the second extension part 102 in the second direction D2 is an end of the second extension part 102 at the other side in the circumferential direction.

As described above, in the second perpendicular direction, the second extension part 102 is fitted to not only the pair of wall portions 47a and 47b of the second insulator piece 40P2 but also the pair of wall portions 46a and 46b of the third insulator piece 40P3. That is, in the present example embodiment, the pair of wall portions 47a and 47b of the second insulator piece 40P2 and the pair of wall portions 46a and 46b of the third insulator piece 40P3 are a pair of second wall portions to which the second extension part 102 is fitted in the second perpendicular direction.

The third extension part 103 is held ranging from the third insulator piece 40P3 to the fourth insulator piece 40P4. The third extension part 103 is supported from below by the support portion 45c of the third insulator piece 40P3 and the support portion 45b of the fourth insulator piece 40P4. Thus, the third extension part 103 ranges from the support portion 45c of the third insulator piece 40P3 to the support portion 45b of the fourth insulator piece 40P4. That is, the first bus bar body 100a ranges from the support portion 45c of the third insulator piece 40P3 to the support portion 45b of the fourth insulator piece 40P4.

The third extension part 103 extends from the other end of the second extension part 102 of the second direction D2 in a third direction D3 perpendicular to the axial direction and intersecting the second direction D2. In the present example embodiment, the third direction D3 corresponds to the second extension direction with respect to the third insulator piece 40P3 and the first extension direction with respect to the fourth insulator piece 40P4. The third direction D3 is a direction intersecting the first direction D1.

One end of the third extension part 103 in the third direction D3 is located between the pair of wall portions 47a and 47b of the third insulator piece 40P3. The one end of the third extension part 103 in the third direction D3 is fitted by the pair of wall portions 47a and 47b of the third insulator piece 40P3 in a third perpendicular direction perpendicular to the axial direction and intersecting the third direction D3. In the present example embodiment, the third perpendicular direction corresponds to the second insertion and support direction with respect to the third insulator piece 40P3 and the first insertion and support direction with respect to the fourth insulator piece 40P4. That is, in the present example embodiment, the third perpendicular direction is perpendicular to the axial direction and both sides in the third direction D3. The one end of the third extension part 103 in the third direction D3 is an end thereof at the one side in the circumferential direction. Another end of the third extension part 103 in the third direction D3 is located between the pair of wall portions 46a and 46b of the fourth insulator piece 40P4. The other end of the third extension part 103 in the third direction D3 corresponds to an end thereof at the other side in the circumferential direction and an end of the first bus bar body 100a at the other side in the circumferential direction.

As described above, in the third perpendicular direction, the third extension part 103 is fitted to not only the pair of wall portions 47a and 47b of the third insulator piece 40P3 but also the pair of wall portions 46a and 46b of the fourth insulator piece 40P4. That is, in the present example embodiment, the pair of wall portions 47a and 47b of the third insulator piece 40P3 and the pair of wall portions 46a and 46b of the fourth insulator piece 40P4 are a pair of third wall portions to which the third extension part 103 is fitted in the third perpendicular direction.

Another end of the third extension part 103 in the third direction D3 is a width-increased portion 103a, the size of which increases in the third perpendicular direction. Thus, a gap between the third extension part 103 and the pair of wall portions 46a and 46b may be reduced between the pair of wall portions 46a and 46b. Accordingly, the first bus bar 100 may be more stably held by the insulator 40. A surface of the other end of the third extension part 103 in the third direction D3 is exposed via the space G1 of the fourth insulator piece 40P4.

Each of these extension parts is positioned between a pair of wall portions and along a wall surface of each of the wall portions. Accordingly, the first bus bar 100 is positioned and held by the insulator 40.

A first corner portion 111 to which the first extension part 101 and the second extension part 102 are connected is located in the space G1 of the second insulator piece 40P2. No wall portion is provided at both sides of the first corner portion 111 in a widthwise direction thereof, and the first corner portion 111 is not fitted to any wall portion. In the present example embodiment, the space G1 of the second insulator piece 40P2 corresponds to a first space between the pair of wall portions 46a and 46b of the second insulator piece 40P2 which are first wall portions and the pair of wall portions 47a and 47b of the second insulator piece 40P2 which are second wall portions.

For example, when a pair of wall portions are provided at both sides of a first corner portion in a widthwise direction, the pair of wall portions extend along the first corner portion while being bent. In this case, the first corner portion is fitted between curved corner portions with respect to the pair of wall portions. However, when an error occurs in the size of the first bus bar due to an error in the length of the first or second extension part, the first corner portion may be misaligned with a curved corner portion with respect to the pair of wall portions and thus cannot be fitted between the wall portions. Accordingly, the first bus bar may not be disposed between the pair of wall portions.

In contrast, according to the present example embodiment, the first corner portion 111 is provided in the space G1. Thus, even when there is a dimensional error of the first bus bar 100, a misalignment corresponding to a width of the space G1 is permitted for the first corner portion 111. Therefore, even when the first corner portion 111 is misaligned due to the dimensional error, the first bus bar 100 may be disposed between wall portions. Accordingly, the first bus bar 100 may be easily disposed and the assemblability of the motor 10 may be improved. As described above, according to the present example embodiment, the motor 10 configured to improve assemblability is obtained.

According to the present example embodiment, the insulator 40 serves as a holding member for holding the first bus bar 100. Thus, the first bus bar 100 may be held by the insulator 40 without additionally forming a holding member to hold the first bus bar 100. Accordingly, the number of components of the motor 10 may be reduced and the assemblability of the motor 10 may be further improved.

In addition, according to the present example embodiment, the first bus bar body 100a is supported by the insulator 40 at a more radially outer side than the coil 34. Thus, a large area of the insulator 40 to support the first bus bar body 100a may be more easily secured, for example, than when the first bus bar body 100a is supported by the insulator 40 at a side which is further radially inward than the coil 34. Therefore, the first bus bar 100 may be easily held by the insulator 40. In addition, the first bus bar body 100a extends in the form of a line bent along the circumferential direction. Accordingly, it is easy to dispose the first bus bar body 100a at a side of the insulator 40 which is further radially outward than the coil 34.

The first corner portion 111 is located at a position overlapping the second insulator piece 40P2 when viewed from the axial direction. Thus, the periphery of the first corner portion 111 may be easily supported by the second insulator piece 40P2. Accordingly, the first bus bar 100 may be stably held by the insulator 40.

As illustrated in FIG. 10, an apex of the first corner portion 111 faces outward in the radial direction. The portions of the insulator 40 are not located at both sides in the radial direction of the first corner portion 111. When the insulator 40 is viewed from the outside in the radial direction, the first corner portion 111 is exposed to the outside of the insulator 40. When the insulator 40 is viewed from the outside in the radial direction, the first corner portion 111 is exposed to the outside of the insulator 40. The first corner portion 111 overlaps the recess 45d when viewed from the axial direction.

For example, when the first bus bar 100 is manufactured by bending a plate member extending linearly, the first corner portion 111 may be bent when folded and thus a portion of the first corner portion 111 may be buckled in the axial direction. Thus, when the first corner portion 111 is supported from below, the first corner portion 111 may be lifted due to the buckled portion. Accordingly, the first bus bar 100 may be lifted and thus may not be accurately disposed.

In contrast, according to the present example embodiment, even when a portion of the first corner portion 111 is buckled, the buckled portion may be withdrawn into the recess 45d. Therefore, the first bus bar 100 may be suppressed from being lifted. Accordingly, the first bus bar 100 may be disposed accurately.

As illustrated in FIG. 3, a second corner portion 112 to which the second extension part 102 and the third extension part 103 are connected is located in the space G1 of the third insulator piece 40P3. No wall portions are provided at both sides of the second corner portion 112 in a widthwise direction and the second corner portion 112 is not fitted to wall portions. In the present example embodiment, the space G1 of the third insulator piece 40P3 corresponds to a second space between the pair of wall portions 46a and 46b of the third insulator piece 40P3 which are second wall portions and the pair of wall portions 47a and 47b of the third insulator piece 40P3 which are third wall portions.

As described above, in the present example embodiment, the first corner portion 111 and the second corner portion 112 are provided as two corner portions in one first bus bar body 100a. In this case, for example, when a pair of wall portions are provided at both sides of each of the corner portions in a widthwise direction, it is necessary to align both sides of each of the corner portions with the bent corner portions of the pair of wall portions. Therefore, when there is a dimensional error of the first bus bar, the first bus bar may not be capable of being fitted between the wall portions.

In contrast, according to the present example embodiment, because the first corner portion 111 and the second corner portion 112 are located in the spaces G1, misalignment of the first corner portion 111 and the second corner portion 112 is permitted. Thus, even when the first corner portion 111 and the second corner portion 112 are misaligned due to the dimensional error, the first bus bar 100 may be provided between the wall portions. Therefore, in the present example embodiment, an effect of easily disposing the first bus bar 100 between the wall portions is particularly useful when two or more corner portions are provided in one first bus bar body 100a.

Furthermore, in the present example embodiment, as described above, the distance between the pair of wall portions 46a and 46b and the distance between the pair of wall portions 47a and 47b increase in an upward direction. Thus, each extension part of the first bus bar body 100a is easily inserted or fitted from above between wall portions. Accordingly, according to the present example embodiment, the first bus bar 100 may be disposed more easily and the assemblability of the motor 10 may be further improved.

The first bus bar body 100a includes intermediate portions 101b, 102b, and 103b. The intermediate portions 101b, 102b, and 103b are located in the spaces G2. The intermediate portion 101b is part of the first extension part 101 located between a portion of the first bus bar body 100a supported by the support portion 45c of the first insulator piece 40P1 and a portion of the first bus bar body 100a supported by the support portion 45b of the second insulator piece 40P2.

The intermediate portion 102b is part of the second extension part 102 located between a portion of the first bus bar body 100a supported by the support portion 45c of the second insulator piece 40P2 and a portion of the first bus bar body 100a supported by the support portion 45b of the third insulator piece 40P3.

The intermediate portion 103b is part of the third extension part 103 located between a portion of the first bus bar body 100a supported by the support portion 45c of the third insulator piece 40P3 and a portion of the first bus bar body 100a supported by the support portion 45b of the fourth insulator piece 40P4.

A portion of the insulator 40 is not located at both sides of the intermediate portions 101b, 102b, and 103b in the radial direction. When the insulator 40 is viewed from the outside in the radial direction, the intermediate portions 101b, 102b, and 103b are exposed to the outside of the insulator 40. When the insulator 40 is viewed from the inside in the radial direction, the intermediate portions 101b, 102b, and 103b are exposed to the outside of the insulator 40.

The coil connection parts 121, 122, and 123 extend from the first bus bar body 100a. The coil connection part 121 is connected to the intermediate portion 101b. The coil connection part 122 is connected to the intermediate portion 102b. The coil connection part 123 is connected to the intermediate portion 103b. The coil connection part 121 has a hook shape which protrudes radially inward from the center of the intermediate portion 101b in the first direction D1 and is curved to the other side in the circumferential direction.

The coil lead wire 34b is fitted between the intermediate portion 101b and the coil connection part 121. That is, the coil lead wire 34b is fitted between the first bus bar body 100a and the coil connection part 121. Although not shown, the coil connection part 122 is caulked outward in the radial direction to grip the coil lead wire 34b between the coil connection part 122 and the intermediate portion 101b. The intermediate portion 101b and the coil connection part 121 are fixed to the coil lead wire 34b, for example, by welding. Thus, the coil lead wire 34b is connected to the first bus bar body 100a and the coil connection part 121. The coil connection part 122 and the coil connection part 123 are the same as the coil connection part 121 except that different intermediate portions are connected thereto.

According to the present example embodiment, the intermediate portions 101b, 102b, and 103b are located in the spaces G2, and the coil connection parts 121, 122, and 123 are connected thereto. Thus, spaces for an operation of caulking the coil connection parts 121, 122, and 123 and an operation for welding the coil connection parts 121, 122, and 123, the first bus bar body 100a and the coil lead wire 34b may be secured due to the spaces G2. Thus, the operations may be easily implemented. Furthermore, the insulator 40 for holding the first bus bar body 100a may be suppressed from being damaged by heat during the welding operation. Accordingly, according to the present example embodiment, the motor 10 configured to easily connect the coil connection parts 121, 122, and 123 and the coil lead wire 34b and capable of suppressing damage to the insulator 40 is achieved.

According to the present example embodiment, the coil connection parts 121, 122, and 123 are connected to the inner edge of the first bus bar body 100a in the radial direction. Thus, as described above, the coil lead wire 34b may be easily connected to the coil connection parts 121, 122, and 123 when the first bus bar body 100a is held by the insulator 40 further outward in the radial direction than the coil 34.

In addition, according to the present example embodiment, each of the intermediate portions 101b, 102b, and 103b is a middle part of an extension part ranging between support portions. Thus, the intermediate portions 101b, 102b, and 103b are spaced apart from the insulator 40 in an upward direction. Accordingly, the caulking work and the welding work may be more easily performed. Furthermore, it is possible to further suppress transfer of heat to the insulator 40 from the first bus bar body 100a during the welding operation, thereby preventing damage to the insulator 40.

As illustrated in FIG. 1, the bearing holder 50 is located on the stator 30. The bearing holder 50 has an annular shape centered on the central axis J. An outer circumferential surface of the bearing holder 50 is fixed on an inner circumferential surface of the housing 11. The bearing 52 is held on an inner circumferential surface of the bearing holder 50. The bearing holder 50 includes a through-hole 50a penetrating the bearing holder 50 in the axial direction. The coil lead wire 34a is passed through the through-hole 501.

The bus bar holder 60 is located on the bearing holder 50. The bus bar holder 60 includes a through-hole 61 passing through the bus bar holder 60 in the axial direction. The second bus bar 70 includes a second bus bar body 71, a connection terminal 72, and a grip portion 73. The second bus bar body 71 is embedded in the bus bar holder 60. The grip portion 73 protrudes inside the through-hole 61 and grips the coil lead wire 34a. The connection terminal 72 is connected to the control device 80.

The control device 80 is located on the bus bar unit 90. The control device 80 is electrically connected to the second bus bar 70 via the connection terminal 72. The control device 80 is a power source which supplies power to the stator 30 via the second bus bar 70. The control device 80 includes a substrate provided with an inverter circuit that controls power to be supplied to the stator 30, and the like.

The present disclosure is not limited to the above-described example embodiments and other configurations to be described below may be employed. The number of first bus bars is not particularly limited as long as one or more first bus bars are provided. The number of corner portions of one first bus bar body is not particularly limited as long as one or more corner portions are provided. That is, the first bus bar body may include only a first corner portion as a corner portion or may include other corner portions as well as the first corner portion and a second corner portion. In addition, a width-increased portion may be located between first wall portions of an insulator piece with the first corner portion to which a first extension part and a second extension part are connected. For example, in the above-described example embodiments, the width-increased portion 101a of the first extension part 101 may be provided between the wall portions 46a and 46b of the second insulator piece 40P2. In this case, the first extension part 101 is supported only by, for example, the second insulator piece 40P2. Furthermore, in this case, a length of the first extension part 101 is less than, for example, that of the second extension part 102. A width-increased portion may be provided on a region of each extension part other than an end thereof. The first bus bar may not include a width-increased portion.

The first direction in which the first extension part extends and the second direction in which the second extension part extends are not particularly limited as long as they are perpendicular to the axial direction and intersect each other. The first perpendicular direction may not be perpendicular to the first direction as long as it is perpendicular to the axial direction and intersects the first direction. The second perpendicular direction may not be perpendicular to the second direction as long as it is perpendicular to the axial direction and intersects the second direction. The third perpendicular direction may not be perpendicular to the third direction as long as it is perpendicular to the axial direction and intersects the third direction. The first bus bar may have a plate surface parallel to the axial direction. The first bus bar may be a general-purpose bus bar. A method of manufacturing the first bus bar is not limited. The first bus bar may be manufactured by punching a plate member according to the appearance of the first bus bar 100 described above.

A plurality of insulator pieces of an insulator may be connected to each other. A holding member for holding the first bus bar is not particularly limited and may not be the insulator. For example, a holding member for holding the first bus bar may be provided separately from the insulator. The number of first wall portions and the number of second wall portions are not particularly limited as long as a pair of each of them are provided. The number of support portions is not particularly limited as long as one or more support portions are provided. A recess may not be provided. A shape of a pressing part is not particularly limited. The pressing part may not be provided. A width of a first opening of a holding groove may be variable in the axial direction. A lower portion of a bottom surface of the holding groove may not be inclined. A shape of an inner edge of the holding groove is not particularly limited. A coil lead wire held in the holding groove may be an end of an end side of a conducting wire of a coil which is wound.

Each space may include not only spaces between wall portions but also spaces around them. Each space may include, for example, a space more radially outward than each wall portion or a space further radially inward than each wall portion. That is, for example, each corner portion provided in each space may be provided to protrude radially outward or inward relative to each pair of wall portions. Each intermediate portion provided in each space may be provided to protrude radially outward or inward relative to each pair of wall portions.

A use of the motor according to the example embodiment described above is not particularly limited. Moreover, the components described above may be combined appropriately within a range in which they are not contradictory to each other.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor including a shaft provided along a central axis;
   a stator including a plurality of coils, the stator facing the rotor and spaced by a gap from the rotor in a radial direction;
   a first bus bar electrically connected to the stator at one side in an axial direction; and
   a holder to hold the first bus bar; wherein
   the first bus bar includes:
      a first extension extending in a first direction perpendicular or substantially perpendicular to the axial direction;
      a second extension extending from an end of the first extension of the first direction in a second direction, the second direction being perpendicular or substantially perpendicular to the axial direction and intersecting the first direction; and
      a first bus bar body including a first corner to which the first extension and the second extension are connected;
   the holder includes:
      a support to support the first bus bar body from another side in the axial direction;
      a pair of first walls which are disposed in parallel or substantially in parallel in a first perpendicular direction and to which the first extension is fitted in the first perpendicular direction, the first perpendicular direction being perpendicular or substantially perpendicular to the axial direction and intersecting the first direction in which the first extension extends; and
      a pair of second walls which are disposed in parallel or substantially in parallel in a second perpendicular direction and to which the second extension is fitted in the second perpendicular direction, the second perpendicular direction being perpendicular or substantially perpendicular to the axial direction and intersecting the second direction in which the second extension extends;
   the pair of first walls include wall surfaces which face each other in the first perpendicular direction, are spaced by a gap from each other, and extend in the first direction;
   the pair of second walls include wall surfaces which face each other in the second perpendicular direction, are spaced by a gap from each other, and extend in the second direction;
   a first space is provided between the pair of first walls and the pair of second walls; and
   the first corner is provided in the first space;
   the stator includes:
      a stator core including a core back extending in a circumferential direction and a plurality of teeth extending from the core back in the radial direction;
      an insulator mounted on the stator core; and
      the plurality of coils, each of which is mounted on a corresponding one of the plurality of teeth through the insulator;
   the holder includes the insulator;
   the first bus bar body, which is radially outward of the plurality of coils, is supported by the insulator, the first bus bar body extending in a line bent in the circumferential direction;
   the plurality of teeth are provided in the circumferential direction;
   the insulator includes a plurality of insulator pieces provided in the circumferential direction, each of the plurality of insulator pieces being mounted on a corresponding one of the plurality of teeth;

the plurality of insulator pieces are disposed adjacent to each other in the circumferential direction and include a first insulator piece, a second insulator piece, and a third insulator piece;

the first extension extends from the first insulator piece to the second insulator piece;

the second extension extends from the second insulator piece to the third insulator piece; and the first corner is provided at a position overlapping the second insulator piece when viewed from the axial direction.

2. The motor of claim 1, wherein the holder includes a recess recessed toward the other side in the axial direction; and the first corner overlaps the recess when viewed from the axial direction.

3. The motor of claim 1, wherein the first bus bar includes a third extension extending from an end of the second extension of the second direction in a third direction perpendicular to the axial direction and intersecting the second direction;

the holder includes a pair of third walls which are disposed in parallel or substantially in parallel in a third perpendicular direction and to which the third extension is fitted in the third perpendicular direction, the third perpendicular direction being perpendicular or substantially perpendicular to the axial direction and intersecting the third direction in which the third extension extends;

the pair of third walls include wall surfaces which face each other and are spaced by a gap from each other, and extend in the third direction;

a second space is provided between the pair of second walls and the pair of third walls; and a second corner to which the second extension and the third extension are connected is provided in the second space.

4. The motor of claim 1, wherein an end of the first extension opposite to a side thereof to which the second extension is connected is a width-increased portion located between the pair of first walls in the first perpendicular direction, wherein a size of the width-increased portion increases in the first perpendicular direction.

5. The motor of claim 1, wherein a distance between the pair of first walls increases toward one side in the axial direction.

6. The motor of claim 1, wherein the first bus bar has a plate shape and includes a plate surface perpendicular or substantially perpendicular to the axial direction.

* * * * *